United States Patent [19]

Sakonju et al.

[11] Patent Number: 5,197,563

[45] Date of Patent: Mar. 30, 1993

[54] CONSTANT-SPEED CRUISING CONTROL SYSTEM FOR VEHICLES

[75] Inventors: Kazutaka Sakonju; Eisaku Hori, both of Yokohama, Japan

[73] Assignee: Jidosha Denki Kogyo Kabushiki Kaisha, Yokohama, Japan

[21] Appl. No.: 711,849

[22] Filed: Jun. 7, 1991

[30] Foreign Application Priority Data

Jun. 8, 1990 [JP] Japan ................................ 2-150183

[51] Int. Cl.$^5$ ........................................... G10K 11/00
[52] U.S. Cl. ...................................... 180/176; 180/179; 123/360
[58] Field of Search ............... 180/170, 174, 176, 177, 180/178, 179; 123/350, 352, 360; 364/426.04, 431.07

[56] References Cited

U.S. PATENT DOCUMENTS

4,790,403  12/1988  Akita et al. ........................ 180/176

*Primary Examiner*—Richard M. Camby
*Attorney, Agent, or Firm*—Sughrue, Mion, Zinn, Macpeak & Seas

[57] ABSTRACT

A constant-speed cruising control system for vehicles comprises a car-speed sensor, a command switch group, a car-speed memory, an actuator for driving a throttle, and a control mechanism which has a cruising control function, a resuming control function after cancelling the cruising control and controls the vehicle speed so as to coincide with a reset cruising speed stored in reponse to a reset operation during the resuming control by driving the throttle in the decelerative direction of the vehicle for the time given by subtracting set initialize time from the sum total of time the throttle is controlled in the accelerative direction of the vehicle during the time from the operation of the resume switch till the reset operation. It is possible to solve the undershooting of the vehicle speed at the transitional time from the acceleration state to the cruising state at the constant-speed.

2 Claims, 5 Drawing Sheets

CONSTANT-SPEED CRUISING CONTROL SYSTEM FOR VEHICLES

BACKGROUND OF THE INVENTION

1. Field of the Invention

This invention relates to a constant-speed cruising control system for vehicles wherein the vehicle speed is automatically controlled to a desired crusing speed.

2. Description of the Prior Art

Heretofore, there has been a constant-speed cruising control system, for example, which is provided with a car-speed sensor for outputting car-speed data proportional to an actual vehicle speed, a command switch for outputting a command signal, a car-speed memory for storing the car-speed data from the car-speed sensor in response to an operation of the command switch, an actuator for driving a throttle in the opening or closing direction, and a control mechanism for giving a command signal to the actuator in accordance with difference between the actual vehicle speed and the stored vehicle speed.

In the constant-speed cruising control system, by operating a set switch of the command switch, the vehicle speed at the time of releasing the set switch subsequent to its pushing operation is stored in the car-speed memory, and the control mechanism gives a command to the actuator in accordance with the difference between the actual vehicle speed and the stored vehicle speed.

Therefore, the vehicle speed is maintained automatically at the constant cruising speed stored in the car-speed memory without operating an accelerator pedal by driving the throttle in the opening or closing direction so as to coincide the actual vehicle speed with the stored vehicle speed through the actuator.

In this state, if the brake pedal is depressed, the automatic control of the vehicle speed is cancelled so that the vehicle speed slows down.

After this, operating a resume switch of the command switch, the control mechanism returns the vehicle speed to the stored vehicle speed and controls the vehicle so as to cruise at the stored speed constantly by driving the throttle through the actuator in response to the operation of the resume switch (resuming control).

When the set switch or an acceleration switch of the command switch is operated (reset operation) during the resuming control the control mechanism newly stores vehicle speed at the time of operating the set switch or the acceleration switch and controls the vehicle speed constant at the speed newly stored at the time of the reset operation by driving the throttle in the closing direction so as to coincide the actual vehicle speed with the newly stored speed through the actuator in response to the reset operation of the set switch or the acceleration switch of the command switch.

However, the aforementioned conventional constant-speed speed cruising control system is so designed that control mechanism controls the throttle by outputting a deceleration signal to the actuator for the time equivalent to the amount of time the control mechanism outputs an acceleration signal to the actuator during a period of time from the operation of the resume switch till the reset operation of the set switch or the acceleration switch in order to switch over the vehicle from the acceleration state according to the resuming control to the state in which the vehicle speed is maintained at the speed newly stored in response to the reset operation.

Therefore, there is the possibility that the throttle is driven in excess in the closing direction by the actuator at the time of switching over from the acceleration state to the cruising state at the constant-speed newly stored by the reset operation, and there is a problem since undershooting of the vehicle speed occurs and pleasant driving may be obstructed.

SUMMARY OF THE INVENTION

This invention is made in view of the aforementioned problem of the prior art. It is an object to provide a constant-speed cruising control system for vehicles which is possible to prevent the undershooting of the vehicle speed at the transient state and realize pleasant driving.

The construction of the constant-speed cruising control system for a vehicles according to this invention for achieving the above mentioned object is characterized by comprising a car-speed sensor for detecting a running speed of a vehicle and outputting car-speed data proportional to the running speed of the vehicle, a command switch group including a set switch and a resume switch, and a acceleration switch if necessary for outputting command signals, a car-speed memorizing means for storing the car-speed data output from the car-speed sensor at the time of operating the set switch as a cruising speed data in response to the operation of the set switch, an actuator for driving a throttle, and a control means which controls the running speed of the vehicle so as to coincide with the stored cruising speed data in response to the operation of the set switch and returns the running speed of the vehicle to the stored crusing speed data by actuating the actuator in response to the operation of the resume switch after cancelling cruising, and which newly stores car-speed data output from the car-speed sensor at the time of a reset operation that is an operation of the set switch or the acceleration switch as a new cruising speed data in response to the reset operation during the return and controls the running speed of the vehicle constant at stored new cruising speed data by driving the throttle in the deceleration direction of the vehicle through the actuator for time given by subtracting set initialize time from the sum total of time the throttle is controlled in the acceleration direction of the vehicle during a period of time from the operation of the resume switch till the reset operation of the set switch or the acceleration switch.

In the constant-speed cruising control system for vehicles having aforementioned construction, the control means controls the running speed of the vehicle so as to coincide with the newly stored cruising speed data by driving the throttle in the deceleration direction of the vehicle for the time given by subtracting the set initialize time from the sum total of time the throttle is controlled in the acceleration direction of the vehicle during a period of time from the operation of the resume switch till the reset operation at the time of switching over to the cruising state at the newly stored cruising speed. Accordingly, the throttle is never actuated in excess at the transitional time from the acceleration state to the cruising state, so that the undershooting of the vehicle speed is solved. Additionally, the set initialize time may be defined as a predetermined value or defined in response to the running speed of the vehicle at the time of the reset operation.

DESCRIPTION OF THE PREFERRED EMBODIMENT

An embodiment of the constant-speed cruising control system for vehicles according to this invention will be explained below with reference to FIG. 1 to FIG. 5.

Figure 1:
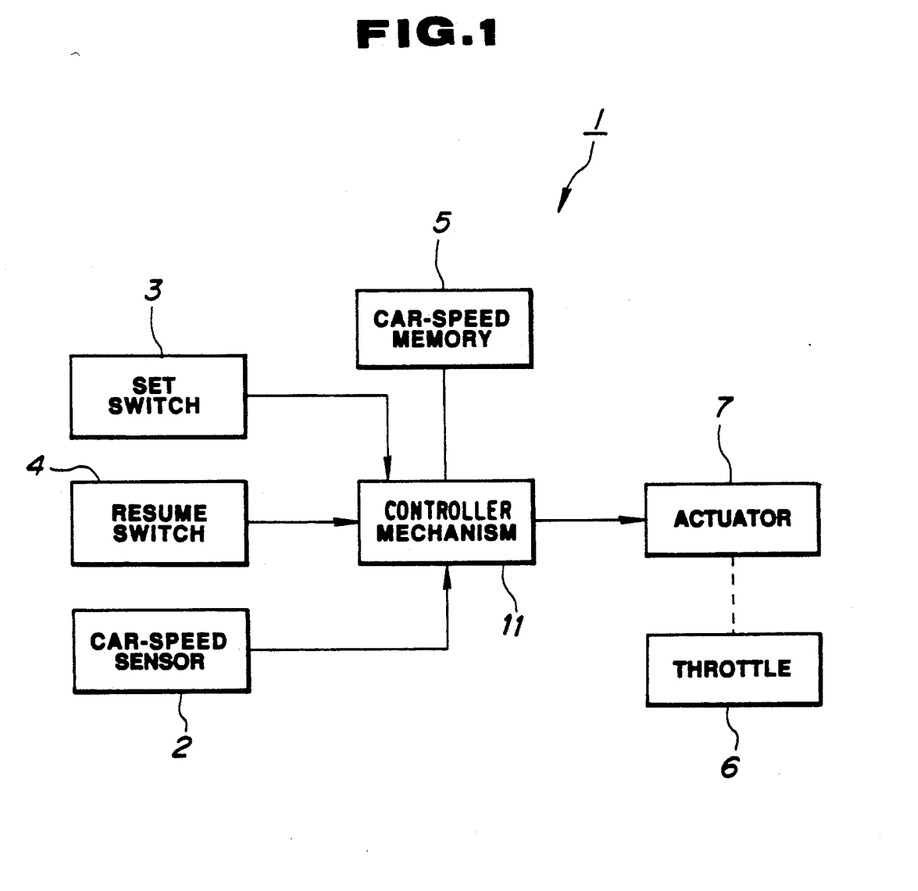
FIG. 1 is a block diagram showing an embodiment of the constant-speed cruising control system for vehicles according to this invention.
Figure 2:
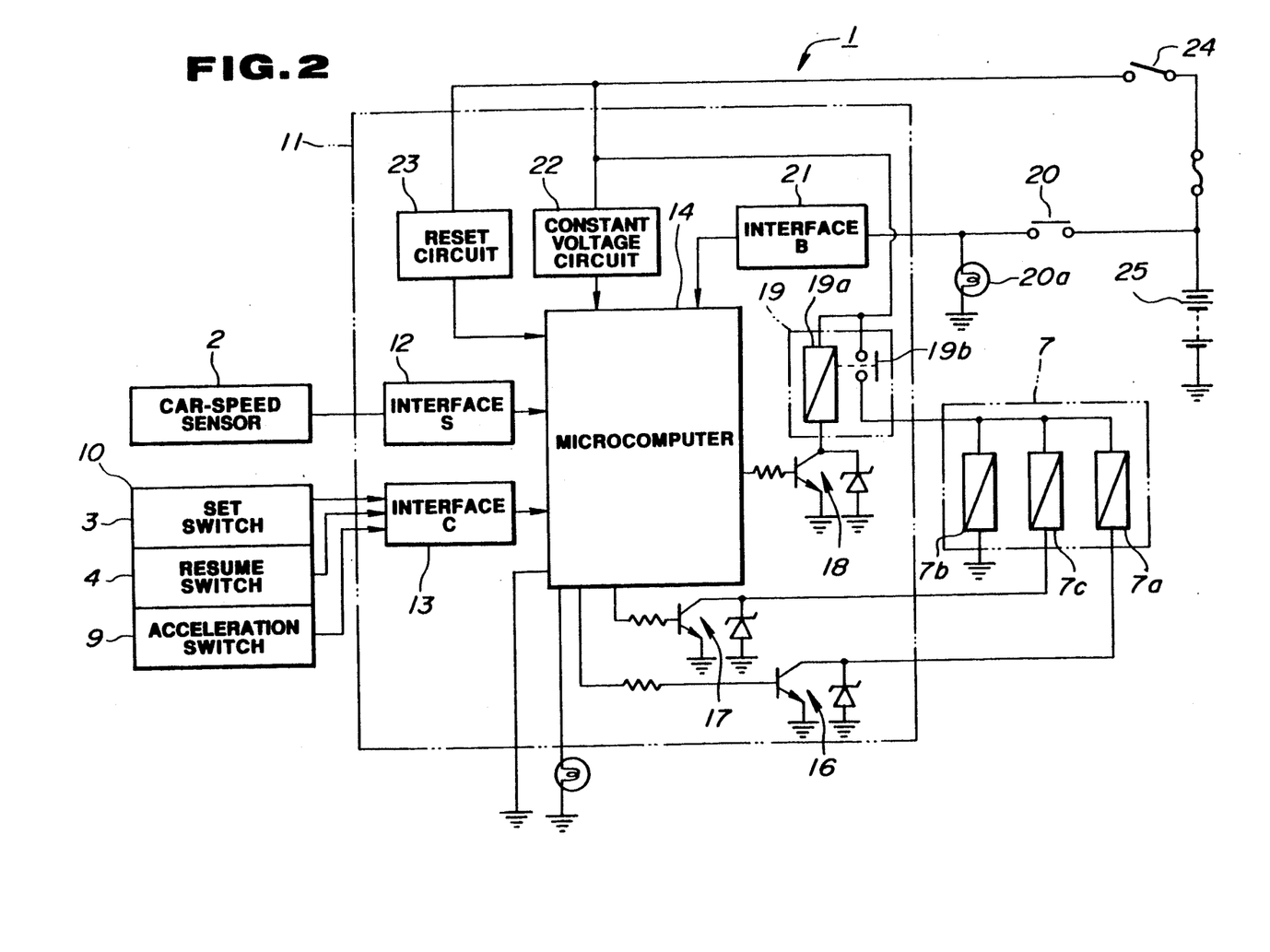
FIG. 2 is a circuit diagram of the constant-speed cruising control system for vehicles shown in FIG. 1.

The constant-speed cruising control system 1 shown in FIGS. 1 and 2 is provided with a car-speed sensor 2 for detecting a running speed of a vehicle and outputting car-speed data proportional to the running speed of the vehicle, and a command switch group 10 for outputting command signals, which includes a set switch 3 for outputting a cruise command signal and resume switch 4 for outputting a resume command signal together with an acceleration switch 9.

The constant-speed cruising control system 1 is also provided with a car-speed memory 5 for storing the car-speed data output from the car-speed sensor 2 at the time of operating the set switch 3 as a cruising speed in response to the cruise command signal output according to the operation of the set switch 3, and an actuator 7 for driving a throttle 6.

The constant-speed cruising control system 1 is provided with a controller 11 which controls the running speed of the vehicle so as to coincide with the stored cruising speed data in response to the operation of the set switch 3, and returns the running speed to the stored cruising speed by actuating the actuator 7 according to fixed acceleration control in response to the resume command signal output by operating the resume switch 4 after cancelling constant-speed crusing at the stored cruising speed in this embodiment, and which newly stores car-speed data output from the car-speed sensor 2 at the time of a reset operation which is an operation of the set switch 3 or the acceleration switch 9 as a new cruising speed data in response to the aforementioned reset operation during the return to the stored cruising speed, and controls the running speed of the vehicle so as to coincide with the newly stored cruising speed data in response to the reset operation of the set switch 3 or the acceleration switch 9 of the command switch group 10.

A microcomputer 14 is disposed in a controller 11 and so designed as to be input with the car-speed signal output from the car-speed sensor 2 and the command signals output from the command switch group 10 through an interface S 12 and an interface C 13 disposed in the controller 11.

The microcomputer 14 is provided with the car-speed memory 5 for storing the running speed of the vehicle (actual vehicle speed) at the time of releasing the set switch 3 of the command switch 10 after pushing it by counting the number of pulses of the operational data (car-speed data) output from the car-speed sensor 2 in response to the releasing operation of the set switch 3.

Figure 3:
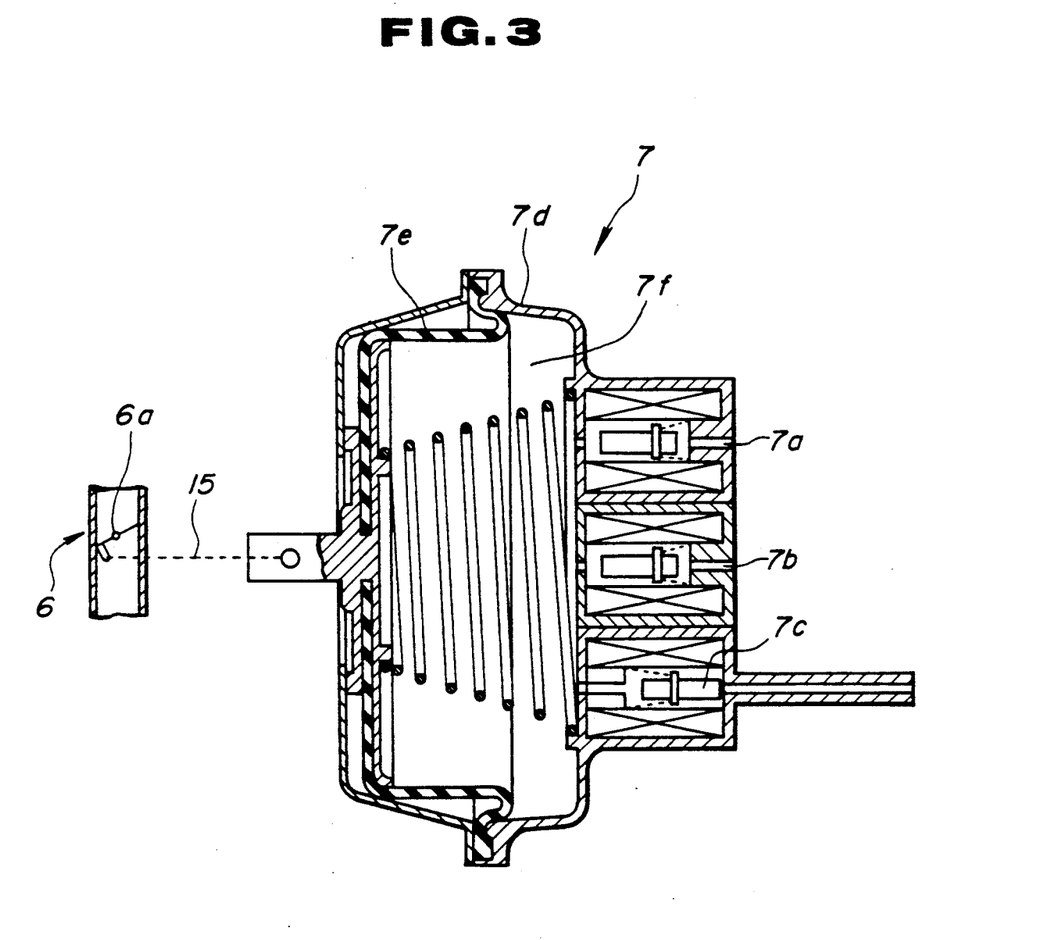
FIG. 3 is a schematic cross sectional view of an actuator in the constant-speed cruising control system of vehicles shown in FIG. 1.

The actuator 7 is provided with, as shown in FIG. 3, a vent valve 7a, a safety valve 7b and a vacuum valve 7c, and one end of the vent valve 7a and safety valve 7b is exposed to atmospheric pressure. One end of the vacuum valve 7c is linked with an intake mainifold (vacuum source), and the other ends of respective valves 7a, 7b and 7c communicates to a negative pressure chamber 7f formed by a casing 7d and the right side surface of a diaphragm 7e as shown in FIG. 3. The left side surface of the diaphragm 7e is connected to one end of a control wire 15, and the other end of the control wire 15 is connected with an axle 6a of a throttle 6 in order to drive the throttle 6 in the opening or closing direction.

The controller 11 is provided with a vent valve switching section 16 for controlling an on-and-off operation of the vent valve 7a in response to a signal output from the microcomputer 14 and a vacuum valve switching section 17 for controlling an on-and-off operation of the vacuum valve 7b in response to a signal output from the microcomputer 14. The controller 11 is also provided with an actuator switching section 18 for controlling an on-and-off operation of a power supply to the actuator 7 in response to a signal output from the microcomputer 14, the power supply to the actuator 7 in this case is carried out by a relay coil 19a and relay contacts 19b of relay 19.

The controller 11 is disposed with a brake switch 20 which is connected to a brake lamp 20a and outputs a signal into the microcomputer 14 through an interface B 21 in order to cancel the automatic constant-speed cruising at the time of a braking operation.

Furthermore, the controller 11 is provided with a constant voltage circuit 22 and reset circuit 23 which are connected to a power source 25 through a main switch 24.

Figure 4:
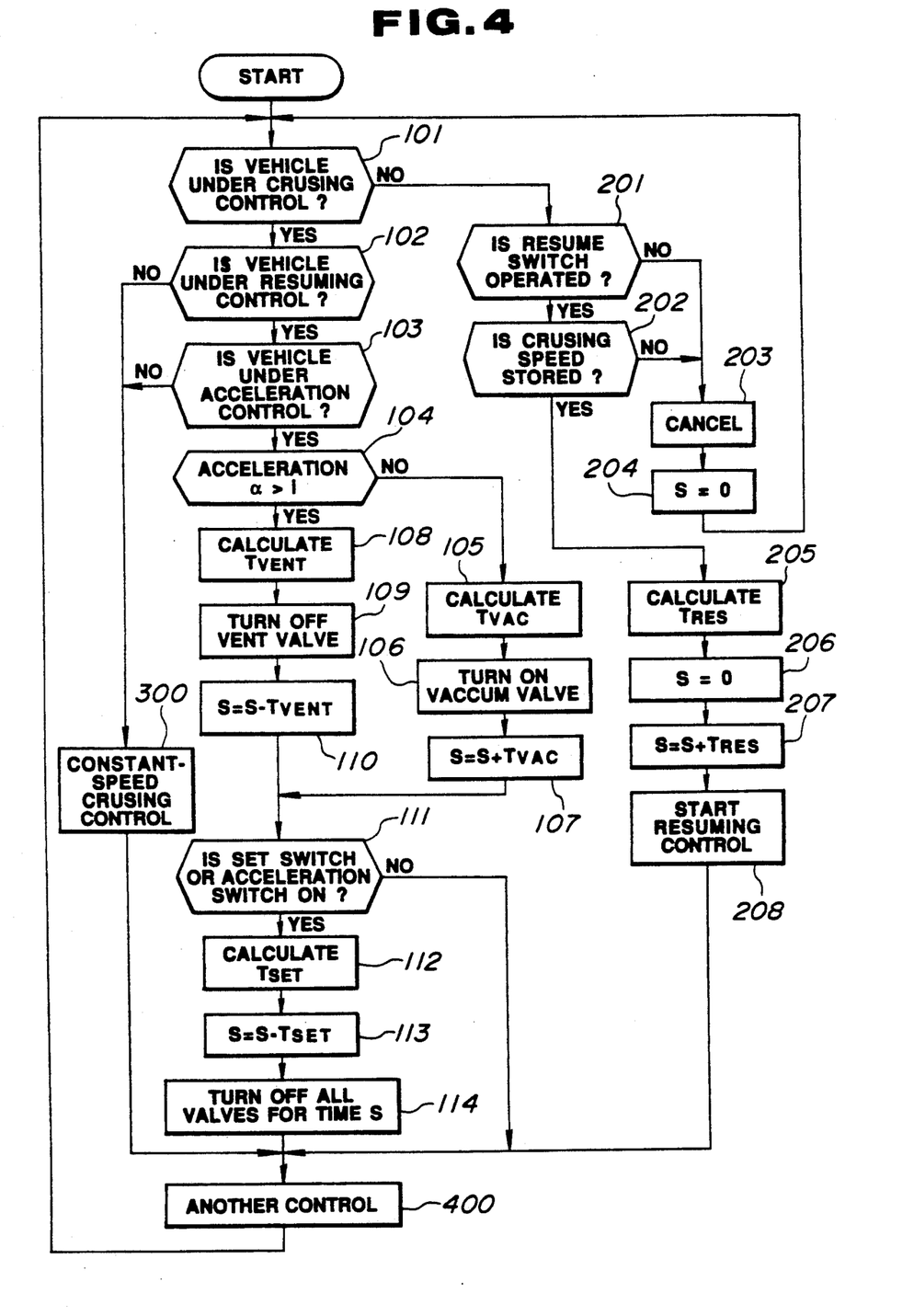
FIG. 4 is a flowchart explaining the operation of the microcomputer in the constant-speed cruising control system of vehicles shown in FIG. 1.
Figure 5:
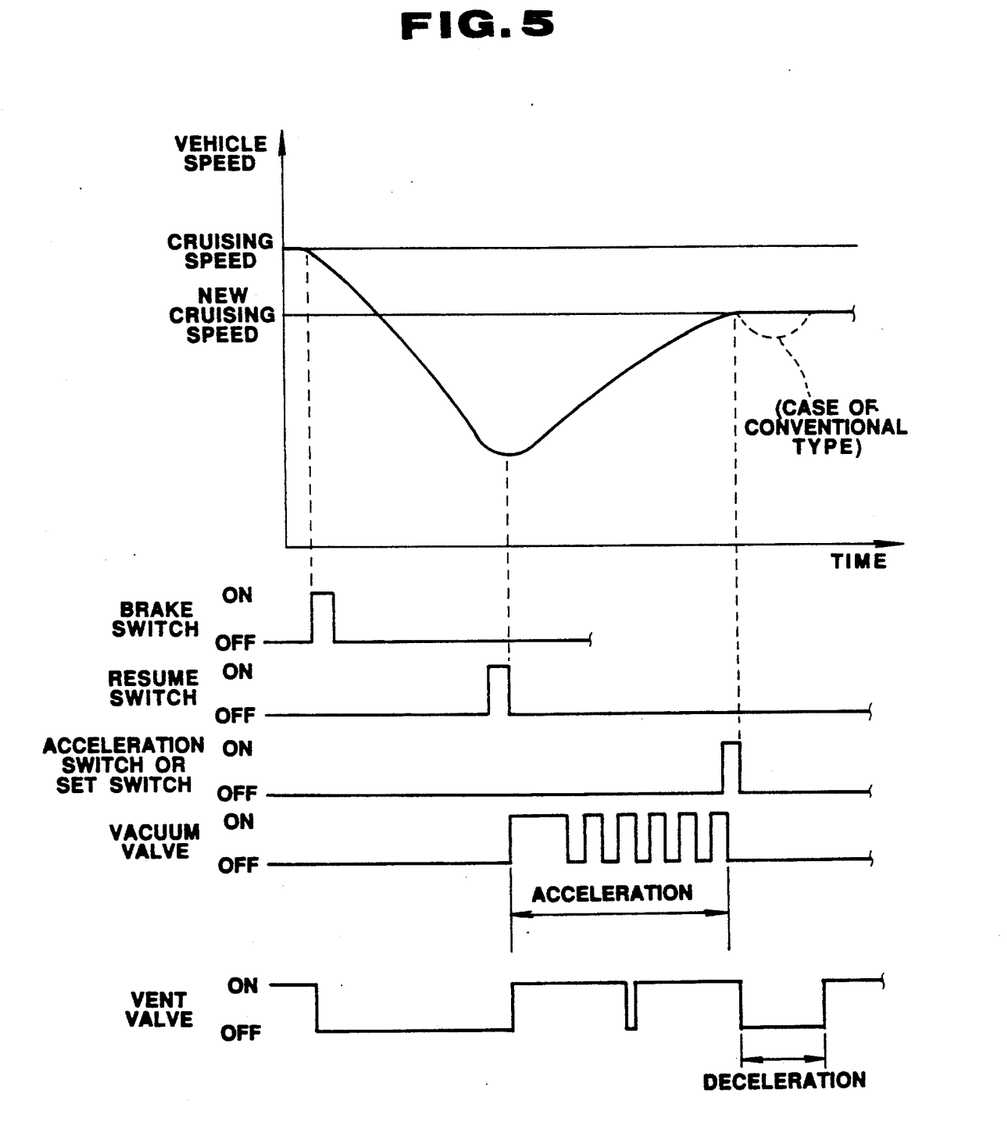
FIG. 5 is a time chart showing the relationship among switch operations, conditions of respective velves and the cruising speed in the constant-speed cruising control system of vehicles shown in FIG. 1.

Next, an explanation will be given about the operation of the constant-speed cruising control system with reference to drawings, especially FIG. 4 and FIG. 5.

First of all, turning on the main switch 24 the car-speed sensor 2 outputs pulse signal which is operational data in proportion to the actual running speed of the vehicle. The microcomputer 14 receives the pulse signal, samples it within a constant period of time, and always recognizes the number of pulses proportional to the actual running speed of the vehicle.

In this state, the running speed of the vehicle is controlled by an operation of an acceleration pedal (not shown) connected to the throttle through another linkage.

Pushing and releasing the set switch 3 of the command switch group 10 when the running speed of the vehicle attains preferable speed suitable for the constant-speed automatic cruising, the running speed at the time of releasing the set switch 3 after its pushing operation is stored as a cruising speed by the car-speed memory 5 in response to the cruise command signal output by the operation of the set switch 3.

The microcomputer 14 excites the relay coil 19a of the relay 19 and supplies the power to the actuator 7 by changing the actuator switching section 18 to its on-state, so that the safety valve 7b changes to the on-state and is closed. The microcomputer 14 changes the vent valve switching section 16 to its on-state and the vent valve 7a is changed to the on-state, whereby the vent valve 7a is closed and the negative pressure chamber 7f is isolated from the external atmosphere.

Furthermore, the microcomputer 14 outputs an acceleration signal to the actuator 7 and turns the vacuum valve 7c to the on-state by changing the vacuum valve switching section 17 to its on-state, so that the vacuum valve 7c is opened to introduce negative pressure into the negative pressure chamber 7f of the actuator 7. Thus the diaphragm 7e moves in the rightward direction in FIG. 3 and the throttle 6 is driven in the opening direction through the control wire 15. Consequently, the running speed of the vehicle attains the cruising speed stored by the car-speed memory 5.

In this time, the microcomputer 14 outputs the acceleration signal for a long time relatively in the first place in order to open the throttle 6 swiftly to its angular displacement corresponding to the stored cruising speed from its closing state through the actuator 7.

After this, if the running speed of the vehicle increases more than stored cruising speed, the microcomputer 14 outputs a deceleration signal to the actuator 7 and turns the vacuum valve switching section 17 and the vent valve switching section 16 to their off-states, so that the vacuum valve 7c is closed and the vent valve 7a is opened. Thus the negative pressure chamber 7f is isolated from the vacuum source and the atmospheric pressure is introduced into the negative pressure chamber 7f through the vent valve 7a, so that the throttle 6 is driven in the closing direction through the control wire 15 connected with the diaphragm 7e.

In such manner, the microcomputer 14 controls the running speed of the vehicle so as to coincide with the stored cruising speed by regulating the throttle 6 automatically in the opening or closing direction according to the on-and-off control of the vent value 7a and the vacuum valve 7c of the actuator 7 through the respective switching sections 16 and 17, accordingly the running speed of the vehicle is maintained at the stored cruising speed constantly without operating the accelerator pedal.

If the brake pedal is depressed in this state, the brake switch 20 is changed on and the cancelling signal is input to the microcomputer 14 through the interface B21, so that the automatic constant-speed cruising is cancelled. Accordingly, the throttle 6 returns in the closing direction, the running speed of the vehicle slows down and the running speed depends on the operation of the accelerator pedal after this.

Furthermore, the resume switch 4 of the command switch group 10 is operated in case of returning the vehicle to the state of automatic cruising of the cruising speed stored before the cancelling. Namely, releasing the resume switch 4 after its pushing operation, the microcomputer 14 starts resuming control to return the running speed of the vehicle to the stored crusing speed and drives the throttle 6 in the opening direction through the actuator 7 by outputting the acceleration signal for a relatively long time defined as resume initialize time in response to the running speed at the time of operating the resume switch 4 in the first step in order to accelerate the vehicle swiftly to the stored cruising speed, and then the running speed of the vehicle is so controlled as to coincide with the stored cruising speed by actuating the throttle 6 in the opening or closing direction according to the on-and-off control of the vacuum valve 7c and the vent valve 7a of the actuator 7 as mentioned above.

In this case, it is possible to maintain the running speed of the vehicle at a running speed at the time of a reset operation of the set switch 3 or the acceleration switch 9 of the command switch group 10 and control the vehicle so as to cruise automatically at the new cruising speed which is the running speed at the time of the reset operation by operating the set switch 3 or the acceleration switch 9 during the return to the originally stored cruising speed (during the resuming control).

Namely, operating the set switch 3 or the acceleration switch 9 during the time of the resuming control, the running speed at the time of the reset operation of the set switch 3 or the acceleration switch 9 is newly stored as a new cruising speed in response to the reset operation of either switch. The microcomputer 14 controls the running speed of the vehicle so as to coincide with the newly stored cruising speed by driving the throttle 6 in the decelerative direction for the time given by subtracting set initialize time defined in response to a running speed at the time of the reset operation from the sum total of time the throttle 6 is controlled in the acceleration direction during a period of time from the operation of the resume switch 4 till the reset operation of the set switch 3 or the acceleration switch 9.

The foregoing control functions will be described below on basis of the flowchart shown in FIG. 4.

First of all, turning on the main switch 24, control starts and judgement is done as to whether the vehicle is under the cruising control by the constant-speed cruising control system 1 or not, that is the vehicle is cruising or not at the stored constant-speed at step 101. At the begining of the control, the judgement at step 101 is done to be "NO" because the running speed of the vehicle is controlled by accelerator pedal, and judgement is done as to whether the resume switch 4 is operated or not at succeeding step 201. Also in this step, the microcomputer 14 judges the resume switch 4 to be not operated (NO) similarly, cancels the system at step 203 and clears a counter value S at step 204, which is an accumulator for counting the sum total of time the microcomputer 14 controls the throttle 6 in the accelerative direction through the actuator 7. And control returns to step 101. In this time, if the resume switch 4 is operated, control also returns to step 101 after executing the aforementioned processes of steps 203 and 204 because judgement is done that the cruising speed is not yet stored in the car-speed memory 5 at step 202(NO).

When the automatic cruising control is started in response to the operation of the set switch 3, the judgement at step 101 is done to be "YES", control proceeds to step 102 and judgement is done as to whether the vehicle is under the resuming control or not. In step 102, the judgement is done that the vehicle is not under the resuming control (NO) because the automatic cruising control has just begun and is not yet cancelled, and the automatic cruising control at the stored constant-speed is continued in proceeding step 300. Control returns to step 101 after executing another control at step 400.

The automatic cruising control is cancelled by depressing the brake pedal and the running speed of the vehicle slows down whereby.

In case of operating the resume switch 4 in this state, the resuming control starts. Namely, when the resume switch 4 is operated, the judgement is done that the vehicle is not under the cruising control at step 101

(NO), and control proceeds to step 205 after judgements to be "YES" in steps 201 and 202. In step 205, the resume initialize time $T_{RES}$ is calculated in response to the running speed at the time of operating the resume switch 4 and the counter value S is cleared at succeeding step 206. The resume initialize time $T_{RES}$ calculated in step 205 is added to the counter value S at step 207. And then the resuming control is started at step 208 by driving the throttle 6 in the opening direction (acceleration direction) during the time S (equal to the resume initialize time $T_{RES}$) in order to accelerate the vehicle swiftly. Control returns step 101 after processing another control in step 400.

In this time, the vehicle is judged to be under the resuming control at step 102 (YES) and judged to be under the acceleration control at step 103 (YES) because the vehicle is accelerate sufficiently by driving the throttle 6 in the opening direction during the resume initialize time $T_{RES}$, and control proceeds to step 104.

In the step 104, judgement is done the present acceleration $a$ is larger than the predetermined acceleration i or not. If the present acceleration $a$ is not larger than predetermined acceleration i (NO), vacuum valve actuating time $T_{VAC}$ is calculated at step 105 and the vacuum valve 7c of the actuator 7 is turned to the on-state at step 106, whereby the vacuum valve 7c is opened to introduce the negative pressure into the negative pressure chamber 7f and the throttle 6 is actuated in the opening direction (acceleration direction of the vehicle) during the vacuum valve actuating time $T_{VAC}$ calculated at step 105, accordingly the vehicle is accelerated.

When the present acceleration $a$ is larger than predetermined acceleration i at step 104 (YES), vent valve actuating time $T_{VENT}$ is calculated at step 108 and the vent valve 7a of the actuator 7 is turned to the off-state at step 109, whereby the vent value 7a is opened to introduce the atmospheric pressure into negative pressure chamber 7f and the throttle 6 is actuated in the closing direction (deceleration direction of the vehicle) through the control wire 15 during the vent valve actuating time $T_{VENT}$ calculated at previous step 108. The vehicle is decelerated. Furthermore, in case of actuating the throttle 6 in the accelerative direction, the vacuum valve actuating time $T_{VAC}$ is added to the counter value S at step 107, and the vent valve actuating time $T_{VENT}$ is subtracted from the counter value S at step 110 in case of actuating the throttle 6 in the decelerative direction of the vehicle. Such processing from step 104 to step 110 is repeated until the set switch 3 or the acceleration switch 9 is operated (reset operation) at step 111, the acceleration $a$ of the vehicle is controlled so as to coincide with the predetermined acceleration i and the vacuum valve actuating time $T_{VAC}$ and the vent valve actuating time $T_{VENT}$ are added to the counter S ($T_{VENT}$ is negative) each time of actuating the valves. Accordingly, the sum total of time the throttle 6 is controlled in the accelerative direction up to the present is always obtained as the counter value S.

In the case where the set switch 3 or the acceleration switch 9 is not operated until the running speed of the vehicle attains the stored cruising speed by the resuming control, the vehicle is judged to be not under acceleration control at step 103 (NO) since the vehicle is not accelerated any more. The automatic cruising control at the stored cruising speed is executed in succeeding step 300, control returns to step 101 after executing another control at step 400.

If the set switch 3 or the acceleration swith 9 is operated (reset operation) before the vehicle is accelerated to the stored cruising speed, judgement is done to be "YES" at step 111 and the set initialize time $T_{SET}$ is calculated in accordance with the running speed at the time of the reset operation at succeeding step 112. The set initialize time $T_{SET}$ calculated at previous step 112 is subtracted from the present counter value S and the new counter value S is calculated at step 113. Subsequently, the microcomputer 14 turns all valves to the off-states and the atmospheric pressure is introduced into the negative pressure chamber 7f of the actuator 7, so that the throttle 6 is driven in the closing direction (deceleration direction of the vehicle) during the time S, that is the time given by subtracting the set initialize time $T_{SET}$ from the sum total of time of controlling the throttle 6 in the acceleration direction at step 114. Control returns to step 101 after executing the process of step 400. Thus the running speed of the vehicle is controlled so as to coincide with the new cruising speed newly stored at the time of reset operation.

Additionally, although the set initialize time $T_{SET}$ is calculated in response to the running speed of the vehicle at the time of the reset operation in this embodiment, it may be defined as a predetermined value independent of the running speed of the vehicle.

As described above, in the constant-speed cruising control system for vehiclesaccording to this invention, the control means controls the running speed of the vehicle so as to coincide with the newly stored cruising speed by driving the throttle in the deceleration direction of the vehicle for the time given by subtracting set initialize time which is defined as a predetermined value or defined in response to a running speed at the time of the reset operation from the sum total of time the throttle is controlled in the acceleration direction of the vehicle during a period of time from the operation of the resume switch till the reset operation at the time of switching over from the acceleration state to the cruising state at the newly stored cruising speed. Therefore, the throttle is never actuated in excess at the transitional time from the acceleration state to the cruising state, so that the undershooting of the vehicle speed is solved and it is possible to realize pleasant driving.

What is claimed is:

1. A constant-speed cruising control system for a vehicle comprising:
 a car-speed sensor for detecting a running speed of a vehicle and generating car-speed data proportional to the running speed of the vehicle;
 command switch means including a set switch for generating a setting signal and a resume switch for generating a resuming signal;
 car-speed data memorizing means for storing the car-speed data supplied from said car-speed sensor as cruising speed data in response to the operation of said set switch of said command switch means;
 a cancelling switch for producing a cancelling signal responding to braking means of the vehicle;
 an actuator for driving a throttle of the vehicle;
 controlling means connected to said car-speed sensor, said command switch means, said car-speed data memorizing means, said cancelling switch and said actuator; said controlling means being responsive to a first setting signal from said set switch of said command switch means for controlling the running speed of the vehicle under a first cruising control state so as to coincide with a cruising speed defined as a first stored cruising speed data in said car-speed data memorizing means in response to a first operation of said set switch of said command switch means, the cancelling signal from said cancelling switch for cancelling the first cruising control state, the resuming signal from said resume switch of said command switch means for controlling the running speed of the vehicle under a resuming control state so as to resume the running speed of the vehicle to the cruising speed of the first cruising control state, and a second setting signal generated from said set switch of said command switch means for controlling the running speed of the vehicle under the resuming control state so as to coincide with a cruising speed defined as a second stored cruising speed data in said car-speed data memorizing means in response to second operation of said set switch of said command switch means; said control means generating a first set initializing signal in proportion to the running speed of the vehicle at the time of said first operation of said set switch of said command switch means to supply the first set initializing signal to said actuator for driving the throttle of the vehicle, a resume initializing signal in proportion to the running speed of the vehicle at the time of operation of said resume switch of said command switch means to supply the resume initializing signal to said actuator for driving the throttle of the vehicle, and a second set initializing signal in proportion to the running speed of the vehicle at the time of said second operation of said set switch of said command switch means;

wherein said controlling means includes:

counter means for counting the sum total of duration time of signals supplied to said actuator during the resuming state by which the throttle of the vehicle is driven in an acceleration direction of the vehicle;

subtracting means for subtracting the duration time of the second set initializing signal from the sum total of duration time counted in said counter means and for generating a subtracting signal; and reset initializing signal generating means for generating a reset initializing signal of duration time determined from the subtracting signal generated in said subtracting means to supply the reset initializing signal to said actuator for driving the throttle of the vehicle in a deceleration direction of the vehicle.

2. A constant-speed cruising control system for a vehicle comprising:

a car-speed sensor for detecting a running speed of a vehicle and generating car-speed data proportional to the running speed of the vehicle;

command switch means including a set switch for generating a setting signal and a resume switch for generating a resuming signal;

car-speed data memorizing means for storing the car-speed data supplied from said car-speed sensor as cruising speed data in response to the operation of said set switch of said command switch means;

a cancelling switch for producing a cancelling signal responding to braking means of the vehicle;

an actuator having a negative pressure chamber, a vacuum valve for driving a throttle of the vehicle in the acceleration direction by introducing negative pressure into the negative pressure chamber and a vent valve for driving the throttle of the vehicle in the deceleration direction by introducing atmospheric pressure into the negative pressure chamber;

controlling means connected to said car-speed sensor, said command switch means, said car-speed data memorizing means, said cancelling switch and said actuator; said controlling means being responsive to a first setting signal from said set switch of said command switch means for controlling the running speed of the vehicle under a first cruising control state so as to coincide with a cruising speed defined as a first stored cruising speed data in said car-speed data memorizing means in response to a first operation of said set switch of said command switch means, the cancelling signal from said cancelling switch for cancelling the first cruising control state, the resuming signal from said resume switch of said command switch means for controlling the running speed of the vehicle under a resuming control state so as to resume the running speed of the vehicle to the cruising speed of the first cruising control state, and a second setting signal generated from said set switch of said command switch means for controlling the running speed of the vehicle under the resuming control state so as to coincide with a cruising speed defined as a second stored cruising speed data in said car-speed data memorizing means in response to second operation of said set switch of said command switch means; said control means generating a first set initializing signal in proportion to the running speed of the vehicle at the time of said first operation of said set switch of said command switch means to supply the first set initializing signal to the vacuum valve of said actuator for driving the throttle of the vehicle, a resume initializing signal in proportion to the running speed of the vehicle at the time of operation of said resume switch of said command switch means to supply the resume initializing signal to the vacuum valve of said actuator for driving the throttle of the vehicle, and a second set initializing signal in proportion to the running speed of the vehicle at the time of said second operation of said set switch of said command switch means;

wherein said controlling means includes:

counter means for counting the sum total of duration time of signals supplied to said actuator during the resuming state by which the throttle of the vehicle is driven in an acceleration direction of the vehicle;

subtracting means for subtracting the duration time of the second set initializing signal from the sum total of duration time counted in said counter means and for generating a subtracting signal; and reset initializing signal generating means for generating a reset initializing signal of duration time determined from the subtracting signal generated in said subtracting means to supply the reset initializing signal to said actuator for driving the throttle of the vehicle in a deceleration direction of the vehicle.

* * * * *